United States Patent [19]

Mifune et al.

[11] Patent Number: 5,373,836
[45] Date of Patent: Dec. 20, 1994

[54] WATER HEATER

[75] Inventors: Hideo Mifune; Serizawa Noriyuki; Shike Tsutomu, all of Yokohama, Japan

[73] Assignee: Tokai Corporation, Kanagawa, Japan

[21] Appl. No.: 953,524

[22] Filed: Sep. 29, 1992

[51] Int. Cl.5 ............................................. F24H 1/00
[52] U.S. Cl. ................................. 126/344; 126/373; 126/390; 126/1 F; 99/447
[58] Field of Search ............... 126/344, 373, 390, 266, 126/262, 214 D; 220/912, 913, 608, 629, 657; 99/447

[56] References Cited

U.S. PATENT DOCUMENTS

| 227,369 | 5/1889 | Lott | 126/266 |
| 777,103 | 12/1904 | Kahn | 126/1 F |
| 1,634,543 | 7/1927 | Hyatt | 126/1 F |
| 2,014,931 | 9/1935 | Genovar, Jr. | 126/390 |
| 2,678,644 | 8/1954 | Banks et al. | 126/266 X |
| 5,125,393 | 6/1992 | Levitin | 126/373 |

FOREIGN PATENT DOCUMENTS

| 54-155741 | 3/1979 | Japan . |
| 56-28224 | 11/1981 | Japan . |
| 58-109413 | 6/1983 | Japan . |
| 59-22623 | 2/1984 | Japan . |
| 3-95826 | 9/1991 | Japan . |
| 215909 | 7/1941 | Switzerland | 126/390 |

Primary Examiner—Larry Jones
Attorney, Agent, or Firm—Brumbaugh, Graves, Donohue & Raymond

[57] ABSTRACT

A portable water heater for use in outdoor activities improved in thermal efficiency. The heater has a double-layered structure, i.e., is constituted of an outer housing, an inner heated vessel, and a gas burner at the bottom thereof. A thermal insulation layer is formed between the housing and the heated vessel sufficient to permit therebetween an upward flow of a combustion gas from the burner to an air outlet located at the top of the heater, thereby heating the vessel. Instead of the thermal insulation layer, a thermal insulation plate in a crimped shape may be interposed between the housing and the heated vessel, so that the thermal efficiency in heating the vessel is further enhanced. The internal heated vessel may be integrally fabricated with the outer housing, or may be arranged to be removable from the housing or the internally disposed crimped plate. The crimped insulation plate may also be shaped either triangularly or sinusoidally.

27 Claims, 15 Drawing Sheets

F I G. 10
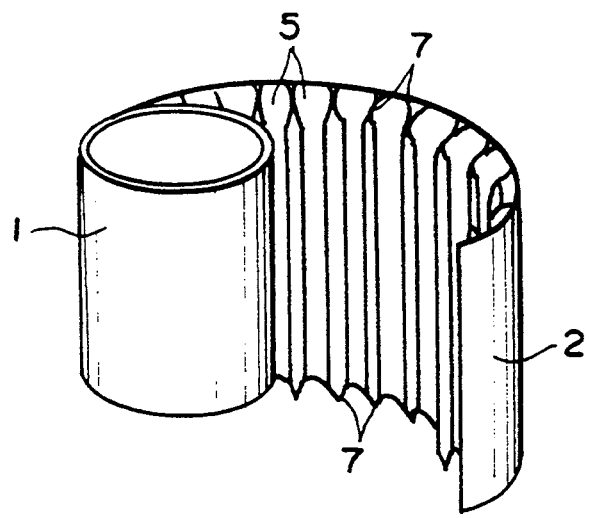
F I G. 15
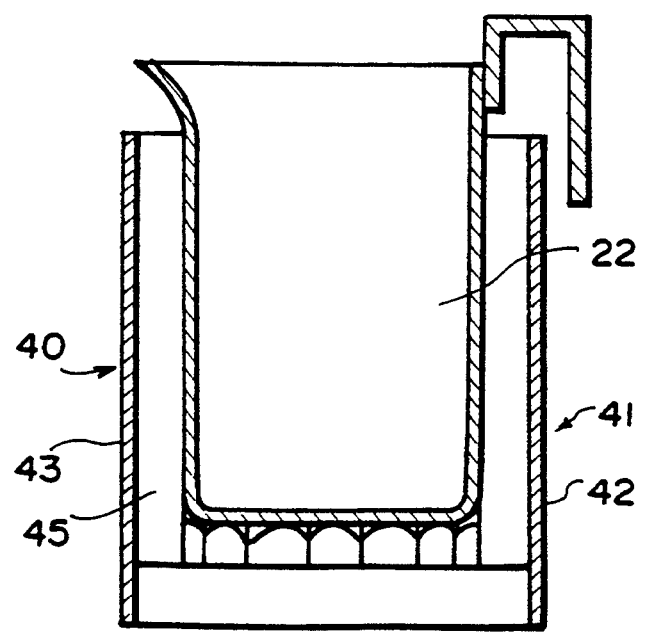

F I G. 16
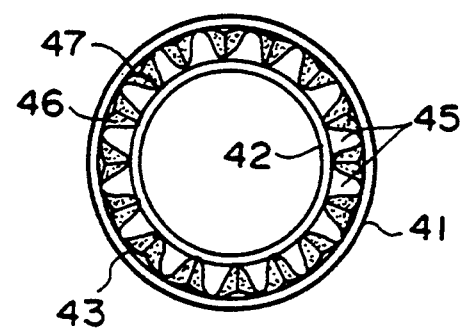
F I G. 18
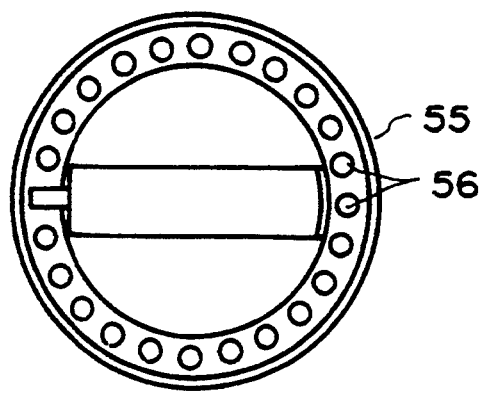

WATER HEATER

BACKGROUND OF THE INVENTION

1. Field of the Invention

This invention relates to a simplified water heater for heating water or other beverages using a portable gas heater and, more particularly, to a water heater utilized in obtaining a minimum amount of hot water quickly and easily.

2. Description of the Prior Art

During outdoor activities such as camping, when a small amount of hot water is necessary in cooking a precooked food or for making tea or coffee, a portable gas heater is generally used in heating water in a kettle.

As seen from FIG. 23 of the accompanying drawings, an existing gas burner for use with that type of portable gas heater is provided with a disk-like or circular burner with a plurality of upwardly directed gas outlets (holes for flames) arranged radially.

With a heated vessel such as a kettle and a cup situated upon the heater having the above structure, flames first spread over the bottom surface of the vessel, as designated by arrows in the drawing. Subsequently, the flames rise along the side surface of the vessel to surround, thereby heating the vessel.

Although the water heaters are different in size, bottom shape, and materials, the thermal efficiency of those existing heaters usually reside in the range of; 40%-50% for a gas burner for domestic use, 30%-40% for a large-sized gas burner, and 30%-40% for a heated vessel having a flat bottom. This is mainly due to a dissipation of the heat accumulated in the vessel into the atmosphere through the side surface thereof, provided that the combustion of gas at the gas burner is perfect.

In gas heaters, it is generally expected that the consumption rate of heat energy be as efficient as possible.

Particularly, in the case of a portable gas heater using a cartridge gas cylinder, in view of the characteristics thereof, improvements in the combustion efficiency of gas leads to a gas cylinder having a longer life span with a limited volume of gas, being reduced in size and weight, and being convenient to carry, thereby resulting in wider applications.

However, since the existing portable gas heaters are restricted in the heating power, a drop in the heating power or the escape of heat from the surface of the vessel (i.e., an open-air cooling) is increased with an ambient temperature of 10 centigrade or less, thereby causing a significant reduction in the heating power.

Under such a condition, in order to prevent as little heat loss as possible, it is essential to form a thermal insulating layer, between the heated vessel and the atmosphere, utilizing the spreading flames along the side surface of the vessel, as if surrounding the vessel.

The differences in the size and the shape of vessels renders the burner difficult to design so that the fire spreads as mentioned above, and the design of the burner is further restricted by the requirement for a certain level of heating power.

Even if the burner can be designed to meet such conditions, the aforementioned shield stream formed around the vessel is easily blown away when it is used in the field, thereby causing a drop in the heating efficiency. Such a decrease in the efficiency is especially noteworthy in the case of a compact heater with small heating power.

In order to cope with such a situation, if a heated vessel which is surrounded with an insulating material is used, the application of heat will be limited only to the bottom thereof, again resulting in the ineffective heat exchange of the gas. Moreover, in this instance, the side wall of the vessel may be damaged by the heat of the gas fire.

SUMMARY OF THE INVENTION

Therefore, a primary object of this invention is to provide a water heater highly efficient in collecting, around a vessel, the heat generated by the combustion of gas, and which is also capable of suppressing a drop in the heating efficiency and improves the combustion efficiency of gas.

Further, another object of this invention is to provide a water heater provided with an integral heated vessel which is removable so that it can be washed.

And still another object of this invention is to provide a water heater incorporating a container in which fluids such as beverages or foods are previously contained.

To these ends, according to a first aspect of this invention, there is provided a water heater comprising:

a heated vessel with one end thereof open, and a housing integrally coupled with the heated vessel in such a manner as to surround the heated vessel with a given distance therebetween, wherein an upper end of the housing is coupled with an upper end of the heated vessel and a bottom open end of the same extends further downwards from the bottom of the vessel, the coupling area between the heated vessel and the housing is provided with at least one air outlet, and a burner means disposed below the bottom of the vessel to produce a hot combustion gas, whereby the gas spreads over the bottom surface of the heated vessel and then flows upwardly through a passage between the heated vessel and the housing and escapes outside the heater from the air outlet after it provides heat to the heated vessel.

A thermal insulating plate, in a crimped shape, should preferably be interposed between the heated vessel and the housing so as to allow the hot combustion gas to rise only through passages where the gas comes in contact with the wall of the heated vessel.

Alternately, the side wall of the heated vessel is preferably arranged in a crimped shape to increase its surface area so that the combustion gas can rise through the passages formed between the side wall and the internal surface of the housing and can escape outside via the air outlet.

According to a second aspect of this invention, there is provided a water heater comprising:

a heated vessel with one end thereof open, and a housing integrally coupled with the heated vessel in such a manner as to surround the heated vessel with a given distance therebetween, wherein the housing comprises a thermal insulating means to be integrally interposed between the heated vessel and the housing, and the thermal insulating means being arranged in such a manner that passages, between the heated vessel and the insulating means, remain open whilst the other passages, between the insulating means and the housing, are evacuated inside and both ends thereof are hermetically sealed so that a plurality of separated evacuated compartments, which act as a thermal insulating layer, can be constituted in a juxtaposed manner with the hollow passages and a burner means disposed below the bottom of the vessel to produce a hot combustion gas, whereby the gas spreads over the bottom surface of the heated vessel and then flows upwardly through a passage between the heated vessel and the housing and escapes outside the heater from the air outlet after it provides heat to the heated vessel.

According to a third aspect of this invention, there is provided a water heater comprising:

a removable heated vessel with one end thereof open, a housing for receiving therein the heated vessel, a burner means disposed below the bottom of the heated vessel, and a thermal insulating means, in a crimped shape, being attached to the inner wall of the housing, whereby a hot combustion gas produced by the burner means spreads over the bottom of the heated vessel and then flows upwardly through passages between the heated vessel and the thermal insulating means, and whereupon the heated vessel is heated.

In order to facilitate the removal of the heated vessel for cleansing, the casing is preferably constituted of a housing longer than the heated vessel and a thermal insulating plate, for instance in a crimped shape, tapered to have a larger diameter at the top end thereof. The heated vessel is preferably tapered in the same manner as the crimped plate so that the tapered surface of the heated vessel, inserted from the top open end of the casing, makes an abutment with the tapered surface of the crimped plate.

According to a fourth aspect of this invention, there is provided a water heater comprising:

a removable heated vessel with one end thereof open, the heated vessel being tapered to be more narrow at the closed bottom end, a housing for receiving the heated vessel herein, a burner means disposed below the bottom of the heated vessel, and a thermal insulating means, in a crimped shape, being attached to the inner wall of the housing and tapered so as to be engaged with the tapered surface of the heated vessel, whereby a hot combustion gas produced by the burner means spreads over the bottom of the heated vessel and then rises through passages between the heated vessel and the thermal insulating means, and whereupon the heated vessel is heated.

According to a fifth aspect of this invention, there is provided a water heater comprising:

a heated container for containing fluid therein, a housing for accommodating the container, wherein the housing is provided with a pair of grooves, each being formed a given distance away from each end of the housing, and wherein the housing is provided with an air inlet formed near bottom thereof, a burner means disposed below the bottom of the heated container, a thermal insulating means, in a crimped shape, being fixedly situated on the inner wall of the housing in a manner such as to be sandwiched between the grooves and having a inwardly folded portion at the bottom end thereof to support the heated container in an abutted fashion, whereby a hot combustion gas produced by the burner means spreads over the bottom of the container and then rises through passages between the heated container and the housing, and an air outlet means being disposed on the top end of the heater and being provided with a plurality of vent holes for adjusting the dissipation of the combustion gas, into the atmosphere, that has reached the top of the heater, wherein an outer flange thereof is coupled with the top edge of the housing and an inner flange thereof is coupled with a top flange of the heated container.

The exhaust plate means acts not only to firmly support the heated container at the center of the water heater, but to adjust dissipation of the hot combustion gas. The exhaust gas escaping from the vent holes contributes to heating the container, whereupon the thermal efficiency of the heater can be improved to a greater extent.

The thermal insulating plate is preferably crimped in a triangle shape, but may be crimped in a sinusoidal shape. The latter case is observed to be inferior to the former case in view of the thermal efficiency. However, the latter case is still far superior to the case where no crimped wave plate is interposed between the heated vessel and the casing, and, hence, it is usable in practical use.

BRIEF DESCRIPTION OF THE DRAWINGS

FIG. 10 is a partial development illustrating a manufacturing process of the water heater shown in FIG. 8;

FIG. 15 is a side cross-sectional view showing a water heater according to a seventh embodiment of this invention;

FIG. 16 is a top plan view showing the water heater shown in FIG. 15;

FIG. 18 is a top plan view showing the water heater shown in FIG. 17;

DETAILED DESCRIPTION OF THE PREFERRED EMBODIMENTS

Upon reference to the accompanying drawings, preferred embodiments of this invention will be described in detail hereinbelow.

Figure 1:
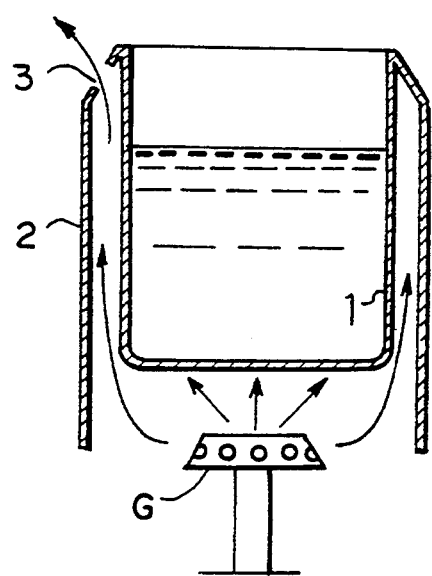
FIG. 1 is a side cross-sectional view showing a water heater, in a heated state, according to a first embodiment of this invention.
Figure 2:
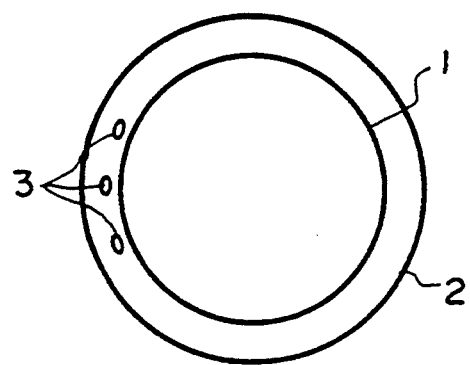
FIG. 2 is a top plan view showing the water heater shown in FIG. 1.

First Embodiment:

In FIG. 1, a cylindrical metal housing 2 surrounds a heated metal vessel 1, and the top ends of them are integrally coupled together by welding or folding. The bottom end of the housing 2 remains open and extends further down than the bottom of the heated vessel 1.

At least one air outlet 3 (three outlets are provided in this specific embodiment) is formed at the coupling area between the housing and the heated vessel.

In this embodiment, a hot combustion gas, resulting from inflammation of gas by lighting a gas burner G, is collected inside by the bottom skirt of the housing 2. The collected hot combustion gas flows upwardly between the internal wall of the housing 2 and the heated vessel 1, and heat exchange is effected between the heated vessel and the combustion gas, while being shielded by means of the housing 2 which prevents dissipation of the combustion gas, whereupon water or other material contained in the vessel is heated and the combustion gas escapes into the atmosphere via the air outlet 3 located on top of the heater.

In view of the efficiency in collecting the combustion gas from the burner G, the bottom skirt portion of the housing 2 should preferably be extended further downwardly of the bottom of the vessel 1. However, unless the skirt portion is excessively shorter than the bottom of the vessel, the skirt portion extending so as to barely cover the bottom of the vessel may be acceptable in practical applications in spite of the fact that a certain drop may occur in the gas collection efficiency.

Figure 3:
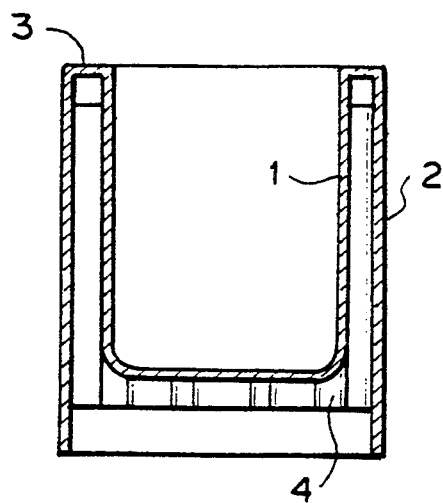
FIG. 3 is a side cross-sectional view showing the structure of a water heater according to a second embodiment of this invention.
Figure 4:
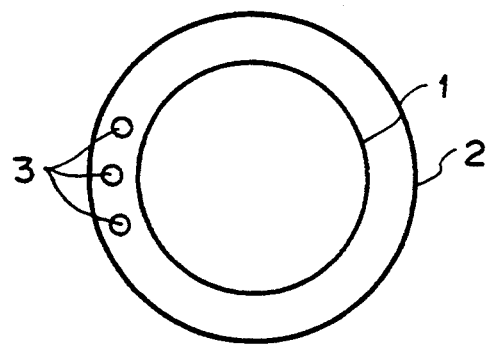
FIG. 4 is a top plan view showing the water heater shown in FIG. 3.
Figure 5:
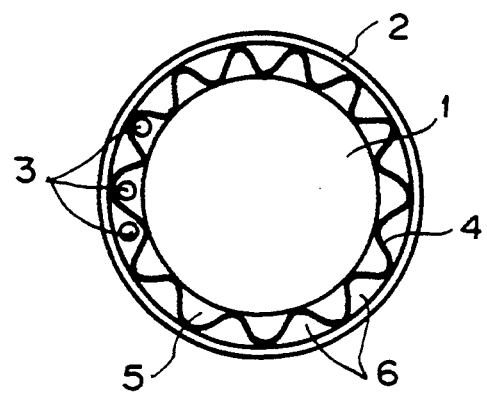
FIG. 5 is a bottom plan view showing the water heater shown in FIG. 3.

Second Embodiment:

FIGS. 3 through 5 show a second embodiment of this invention. In the drawings, a crimped plate 4 is fixedly interposed between the heated vessel 1 and the housing 2. The bottom end of the crimped plate 4 extends below the bottom of the heated vessel 1, thereby constituting a skirt portion. This skirt portion effectively guides the hot combustion gas, resulting from the inflammation of gas, through triangular passages between the heated vessel and the crimped plate 4.

The water heater, according to the second embodiment, enables the hot combustion gas, resulting from the inflammation by the burner G, to proceed through passages 5 between the heated vessel 1 and the crimped plate 4. The gas initially spreads around the bottom of the vessel 1, and, in turn, the majority of the same is collected into the skirt 4, which extends below the bottom of the vessel 1.

The hot combustion gas enters the passages 5, rises therethrough, and escapes outside via the air outlet 3 which is positioned at the coupling area between the vessel 1 and the housing 2.

Meanwhile, the remaining passages 6, between the crimped plate 4 and the housing 2, serve as a passage for air flow and keep the inside of the heater hot.

Figure 6:
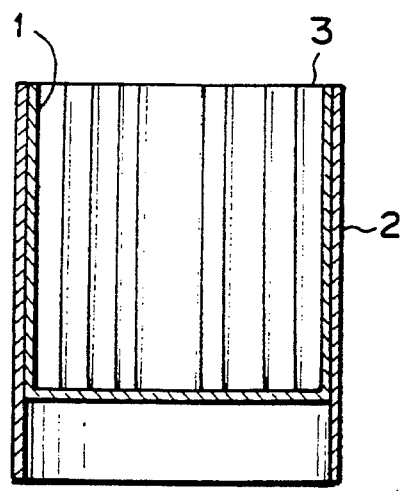
FIG. 6 is a side cross-sectional view showing the structure of a water heater according to a third embodiment of this invention.
Figure 7:
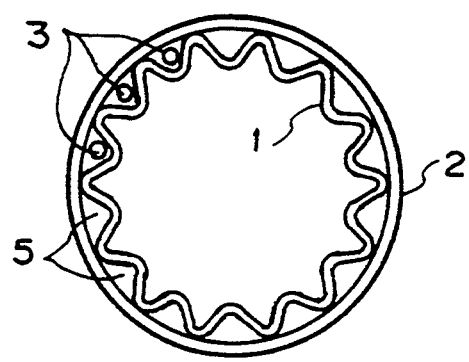
FIG. 7 is a top plan view showing the water heater shown in FIG. 6.

Third Embodiment:

Referring to FIGS. 6 and 7, the side wall of the heated vessel 1 is formed in a crimped shape, whereupon the heated surface area of the vessel 1 is increased. The hot combustion gas, resulting from the inflammation by the burner G, is collected into the housing 2. The increase in the contact surface of the heated vessel leads to the thermal efficiency being improved during the flow and escape of the gas via the passages 5 and the air outlet 3.

Figure 8:
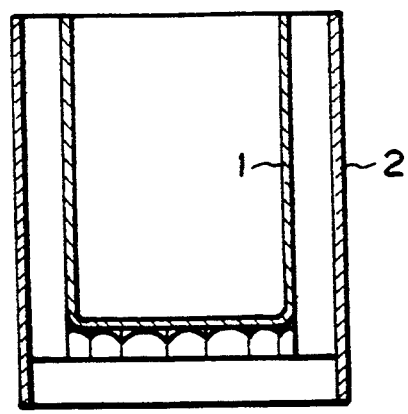
FIG. 8 is a side cross-sectional view showing the structure of a water heater according to a fourth embodiment of this invention.
Figure 9:
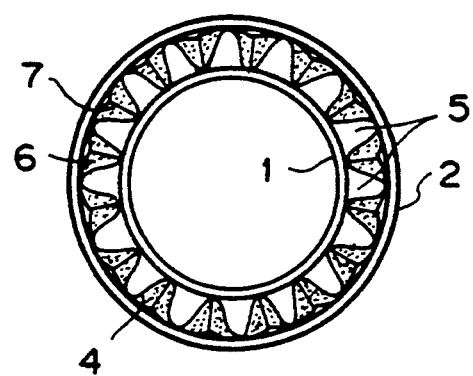
FIG. 9 is a top plan view showing a crimped plate housed in the water heater shown in FIG. 8.

Fourth Embodiment:

Referring to FIGS. 8 and 9, both ends of the passages 6, integrally formed between the heated vessel and the housing 2, are evacuated and hermetically sealed, so that they are formed into a plurality of independent evacuated compartments. Particularly, as shown in FIG. 10, both top and bottom edges of the passages 6 are flattened inwardly, and the thus flattened contact portions 7 are welded in vacuum, whereby a plurality of evacuated compartments are formed in a juxtaposed manner with the hollow passages.

With such an arrangement, the hot combustion gas, resulting from the inflammation by the burner G, rises through the passages 5 and heats the vessel 1. The evacuated compartments constitute a convection thermal insulator, whereupon the dissipation of the heat, from the hot gas, into the atmosphere is significantly prevented and the thermal efficiency is improved.

As described above, the water heater, according to this invention, is provided with a housing having a double layer structure, wherein the side wall of the heated vessel is heated by the flow of the hot combustion gas, resulting from the inflammation of the burner, through the passages of the housing. As a result of this, the dissipation of the heat, from the gas, into the atmosphere can be suppressed to a minimum, and the heat can be collected into the heater with a high degree of efficiency. Moreover, the presence of the housing prevents the dissipation of heat from the heated vessel. Eventually, the thermal efficiency of the water heater having the double layer structure is improved by approximately 50% when compared with the conventional heater used in the outdoors without a wind shield, and the water heater with the crimped plate is observed to be improved, in thermal efficiency, by approximately 80% when compared with the existing heater.

Thus, it will be understood that the water heater according to this invention is very effective in practical use.

Figure 11:
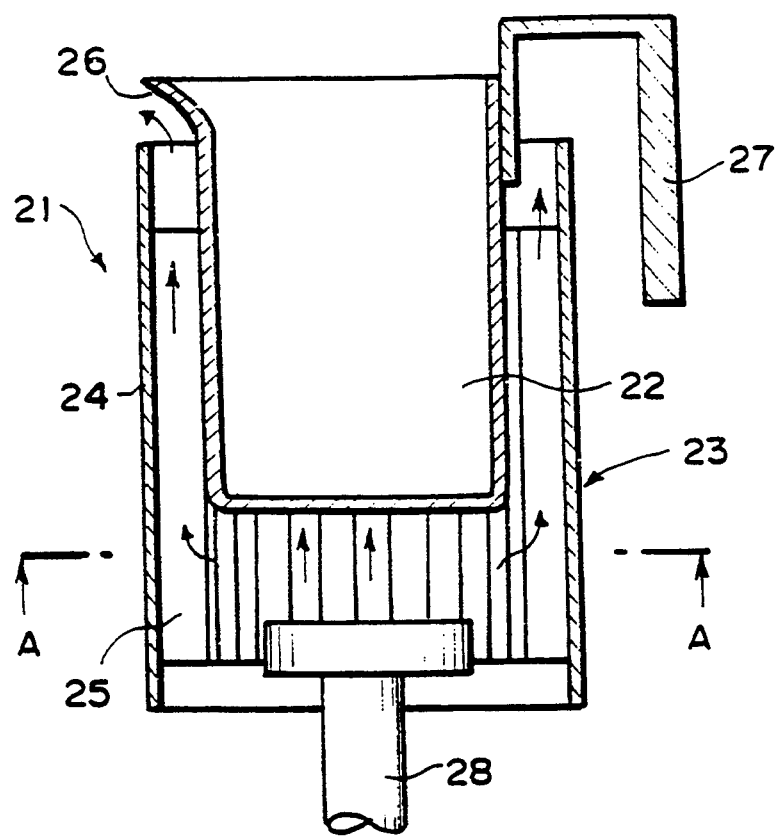
FIG. 11 is a side cross-sectional view showing a water heater according to a fifth embodiment of this invention.
Figure 12:
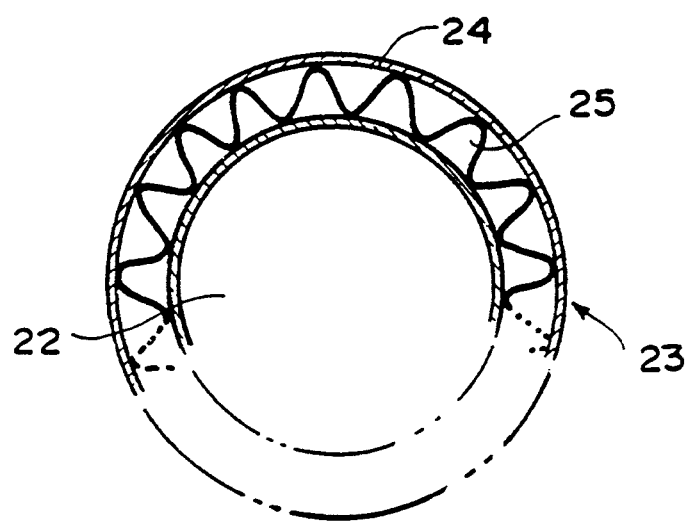
FIG. 12 is a transverse cross-sectional view taken along A—A of the water heater shown in FIG. 11.

Fifth Embodiment:

Referring to FIGS. 11 and 12, a water heater 21, according to this embodiment, is constituted of a cylindrical heated vessel 22 with one open end and a casing 23, wherein the casing is composed of a cylindrical housing 24 and a crimped plate 25 fixed inside of the housing.

The vessel 22 is of metal having a superior thermal efficiency (e.g. aluminum or copper). Provided at the top end of the vessel are a flange 26, with sufficient curvature so that pouring coffee or other liquids into another cup is facilitated, and a catch 27.

The casing 23 includes the cylindrical housing 24 and the crimped plate 25; and the housing 24, being longer than the vessel 22 and having open ends, is made up of a hard stainless steel. Attached to the inner wall of the housing 24 is the crimped plate 25, longitudinally shorter than the housing 24 by a nominal length, whereby the plate is comprised of a plurality of crimps as shown in FIG. 12. The internal diameter of the crimped plate 25 is substantially the same as the outer diameter of the heated vessel 22, whereupon the heated vessel 22, inserted via the open end of the casing 23, is engaged with the crimped plate 25 in a removable fashion. The crimped plate 25 extends below the bottom of the heated vessel 22. A reference numeral 28 designates a gas burner disposed below the heated vessel 22. Both the vessel 22 and the casing 23 may be of a metal which possesses the same thermal expansion coefficient.

The operation of the water heater 21, having the foregoing structure, will now be described.

The heated vessel 22, filled with a predetermined amount of liquid, is inserted into the casing 23, so that the heated vessel is engaged with the casing. The gas burner 28 is ignited. A hot combustion gas, resulting from the inflammation of gas, rapidly heats the bottom surface of the vessel 22 and the side wall of the same by supplying heat to the vessel 22 during the upward flow through the passages of the crimped plate 25, which allows contact with the surface of the vessel.

When the liquid contained in the vessel 22 has been boiled or heated to a desired temperature, the gas burner 28 is turned off.

Figure 13:
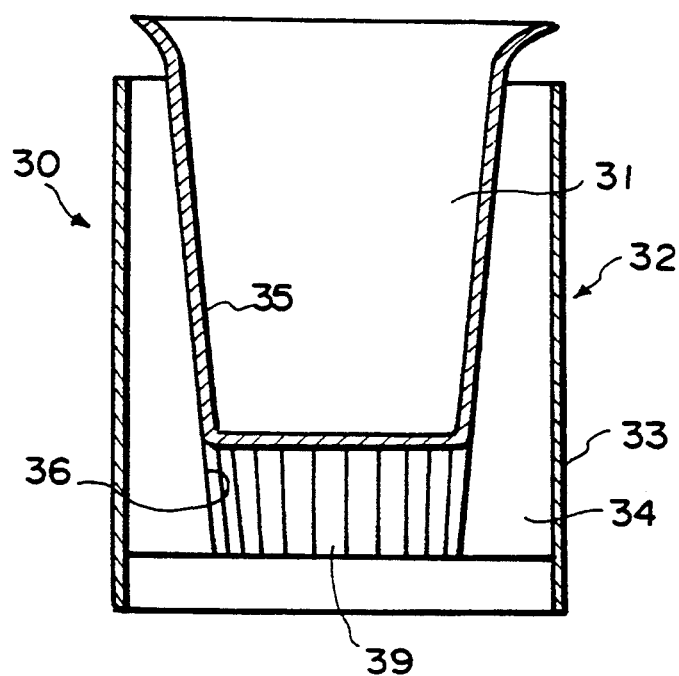
FIG. 13 is a side cross-sectional view showing a water heater according to a sixth embodiment of this invention.

Sixth Embodiment:

FIG. 13 illustrates a water heater 30 exemplifying the sixth embodiment of this invention. The heater is constituted of a cylindrical vessel 31 with one end thereof open and a casing 32 with a crimped plate 34 attached inside thereof.

Figure 14:
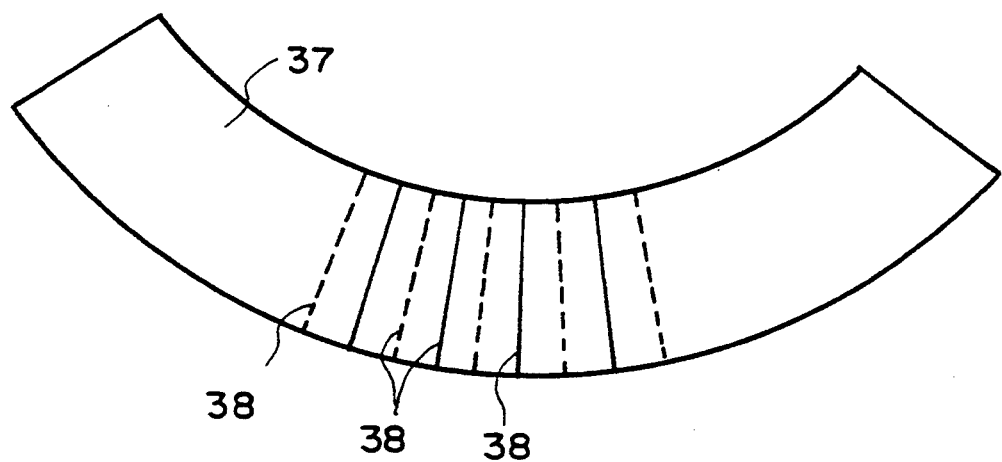
FIG. 14 is a development showing a crimped plate according to the sixth embodiment shown in FIG. 13.

The vessel 31 is of aluminum or copper, and is provided with a tapered surface 35, which narrows downwardly, and a flange, which extends radially. The casing 32 includes the cylindrical housing 33 and the crimped plate 34, and the housing 33 is formed in a cylindrical shape with both ends thereof open. Attached to the internal wall of the housing 33 is the crimped plate 34 with a tapered surface 36. As shown in FIG. 14, the tapered surface 36 is constituted of a fan-shaped metal strip 37 with one end thereof being shorter than the other end thereof. The bottom end of the crimped plate 34 is shorter than the bottom end of the housing 33.

The vessel 31 is inserted into the casing 32 to such an extent that the bottom of the casing remains partially uncovered with the heated vessel. Eventually, the tapered surface 35 of the vessel 31 and the tapered surface 36 of the crimped plate 34 are engaged with each other. Such a structure permits a perfect engagement of the two elements with easy removal. The heated vessel 31 with the tapered surface 35 may also be employed in the water heater 21 according to the fifth embodiment.

The hot combustion gas, resulting from the inflammation of gas, heats the bottom of the vessel 31, and rises through passages 39 along the crimped plate 34. The bottom of the crimped plate extends below the vessel. The tapered surface 35 of the vessel 31, widening upwardly, permits a more rapid heating of the side surface of the vessel 31 because of an increase in the surface area of the crimped plate 34 which allows contact of the combustion gas with the side wall of the heated vessel, thereby improving the thermal efficiency.

The crimped plate 34 of this invention will be manufactured as follows:

As shown in FIG. 14, a fan-shaped metal strip 37 is marked with scribe to define a plurality of folded lines 38 in such a manner that one end of each folded section is narrower than at the other end of the same. The plate is alternatingly folded at the lines. The thus folded strip is formed into a cylindrical shape by coupling both ends of the plate together. This cylindrical plate is then arranged to have a constant pitch between the crimps at both ends thereof.

Seventh Embodiment:

A water heater 40, according to the seventh embodiment, is internally provided with a crimped plate 43 which is different in shape from other crimped plates of the preceding fifth and sixth embodiments.

As shown in FIG. 16, passages 46 of the crimped plate 43, between the plate and a housing 42, are formed into a plurality of independent compartments by folding both ends of each passage and welding the folded portions thereof, with the inside thereof being evacuated. The evacuated compartments 46 serve as a convection thermal insulator, so that the heat transferred during the flow of a combustion gas through passages 45 is effectively confined inside the casing 41 and, in turn, heats the vessel.

As described above, the water heater according to the embodiments 5 through 7 are characterized in that the crimped plates are attached to the housing so that the heated vessel is rendered freely removable. Thus, the water heater with the structure as set forth above is reduced in weight, and allows easy cleaning of the heated vessel.

Figure 17A:
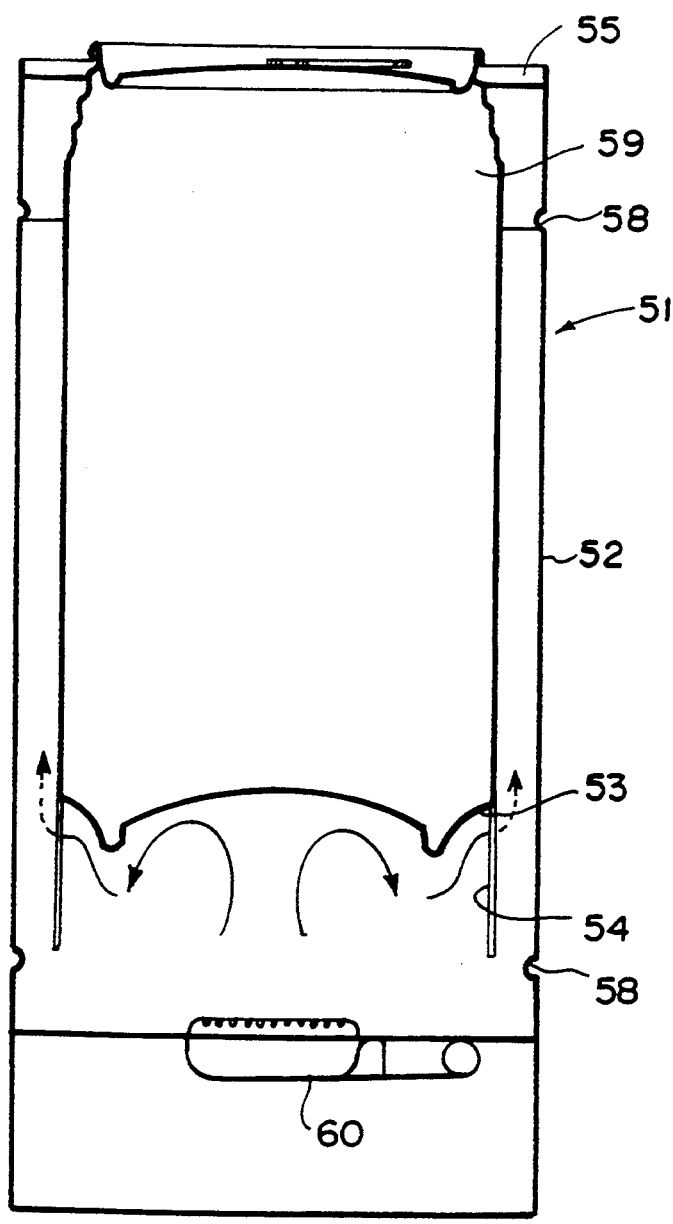
FIG. 17A is a side cross-sectional view showing a water heater according to an eighth embodiment of this invention.
Figure 17B:
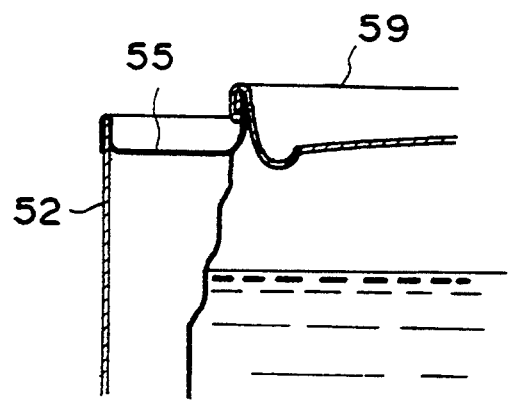
FIG. 17B is a partially broken view showing the water heater and a container according to the eighth embodiment.
Figure 17C:
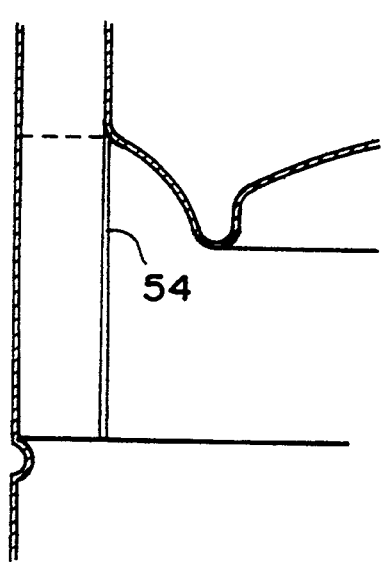
FIG. 17C is a partially enlarged cross-sectional view showing the water heater shown in FIG. 17A.
Figure 17D:
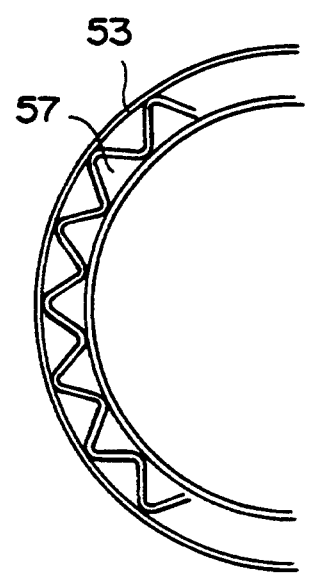
FIG. 17D is a partially enlarged top plan view showing a crimped plate interposed between a housing and a container.

Eighth Embodiment:

Referring to FIGS. 17A–17D and 18, a heater 51 is constituted of a cylindrical housing 52, a crimped plate 53 and an air outlet plate 55. Formed on the surface of the housing 52 are a pair of grooves 58 by which the crimped plate 53 is axially supported inside the housing 52. The impact resilience of the crimped plate also contributes to the fixation thereof. As shown in FIGS. 17C and 17D, the crimped plate 53 is interposed between the container 59 and the housing 52, and the bottom end thereof 54 is folded inwardly to support the bottom outer edge of a container 59 previously incorporated in the heater. Specifically, the container 59 is longitudinally supported on the top of the folded portion 54 of the crimped plate 53, and laterally supported by ridges of the crimped plate 53 projecting to the center of the housing.

As shown in FIG. 17B, the air outlet plate 55 is situated to surround the container 59, and the inner flange of the plate 55 is engageably coupled with the top folded periphery of the container 59. Meanwhile, the outer flange of the air outlet plate 55 is folded outwardly to be engaged with the top end of the housing 52. Moreover, the air outlet plate 55 is provided with a plurality of vent holes 56 between the inner and outer flanges thereof to allow the escape of a combustion gas and to enable the container to be situated at the center of the heater.

Positioned below the container is a conventional gas burner 60 to heat the container.

The principle operation of this heater 51 will be described upon reference to FIGS. 17A–17D and 18.

A hot combustion gas, produced by the gas burner 60, first spreads over the bottom surface of the container 59. The presence of a circular protrusion on the bottom of the container, as shown in FIG. 17A, causes the combustion gas to be introduced into the passages 57 between the container 59 and the housing 52 along the concave curvature of the bottom protrusion as designated by the arrows in FIG. 17A. During the upward flow of the combustion gas, the heat of the gas is transferred to the outer wall of the container 59, so that the contained fluid is heated. The combustion gas, reaches the top of the heater, then escapes through the vent holes 56. The number and diameter of the vent holes depends on a secondary air inlet necessary for introducing air and effecting a perfect combustion, whereby the thermal efficiency is improved.

Given that the air outlet plate 55 is provided with 18 vent holes, each having a diameter of 7 mm, the water heater with the air outlet plate 55 is superior, in thermal efficiency by approximately 68%, to the water heater having the same structure other than the air outlet plate, whilst the water heater having the same structure without the air outlet plate is still superior to the existing heater by approximately 60%. It will be apparent that the hot combustion gas, which freely escapes the housing when the air outlet plate is absent, is trapped and utilized in heating the container, whereupon the thermal efficiency is improved to a greater extent. However, the use of the vent holes, being smaller and fewer than the above case, adversely affects the combustion efficiency of the gas because of an increase in the exhaust resistance.

In addition to the above factor, the thermal efficiency is dependent on the number of crimps and the height of each crimp's ridge (i.e. a transverse area of each passage).

Figure 19:
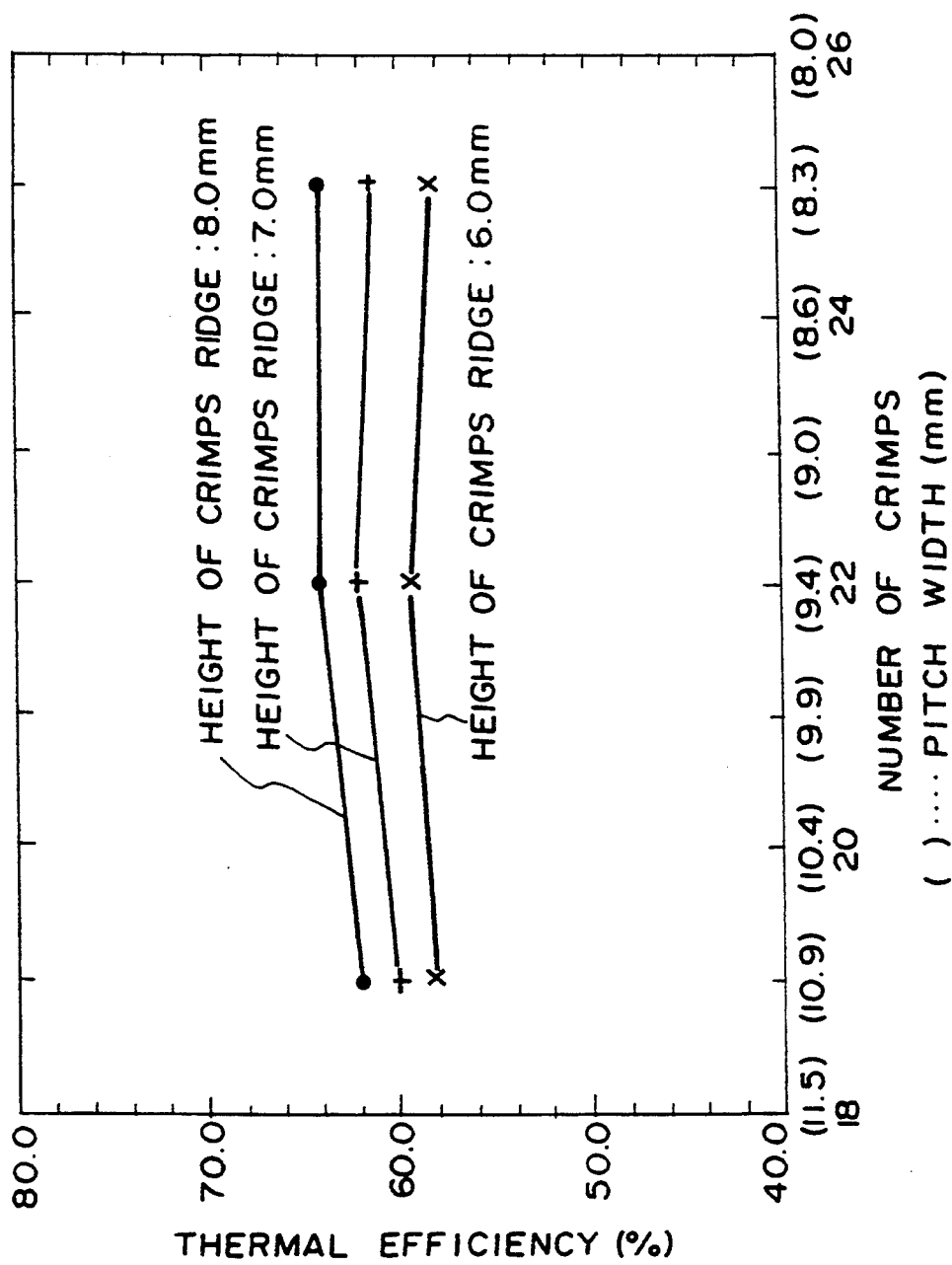
FIG. 19 shows a graph illustrating the relationship between the number of crimps and the thermal efficiency.

FIG. 19 of the accompanying drawings illustrates the relationship between the thermal efficiency and the number of crimps. As can be seen from the graph, the thermal efficiency tends to increase as the height of each crimp's ridge is increased but stabilizes with the number of crimps around 22. When a comparison is made with a conventional heater without any crimped plate, the water heaters incorporating the crimped plate shown in FIG. 19 are found to be improved in thermal efficiency with respect to the conventional heater by only between 30%–40%.

Figure 20:
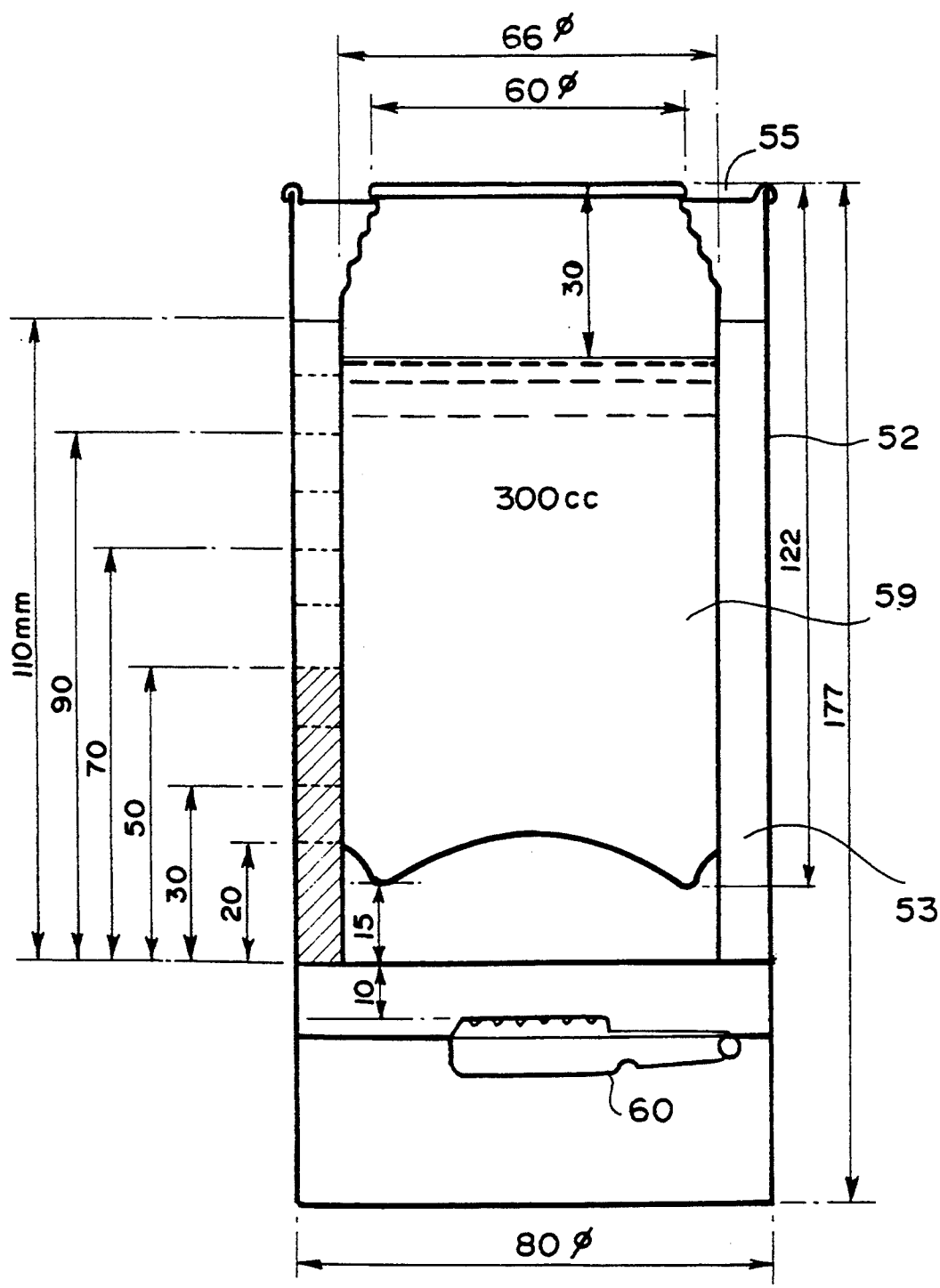
FIG. 20 is a longitudinal cross-sectional view showing dimensions of the water heater, according to the eighth embodiment, employed in experiments.

The relationship between the transversal area of each passage and the thermal efficiency is obtained by varying the number of crimps and the height of the ridge, with a structure as shown in FIG. 20, under the following conditions:
Gas: isobutane
Flow rate: 250 cc/min, 0.56 g/min
Fluid Temp.: heated from 20 to 100 centigrade
Amount of Contents: 300 cc
Volume of Container: 350 cc
Height of Crimped Plate: 90 mm
Plate thickness: 0.2 mm

TABLE 1

| (H) | CRM (W) 19 (10.9) | CRM (W) 22 (9.4) | CRM (W) 25 (8.3) |
|---|---|---|---|
| 6.0 | (A) 32.7 mm² (TH.EF) 59% | (A) 28.2 mm² (TH.EF) 59.5% | (A) 24.9 mm² (TH.EF) 59% |
| 7.0 | (A) 38.2 mm² (TH.EF) 60% | 32.9 mm² (TH.EF) 61% | (A) 29.1 mm² (TH.EF) 60.5% |
| 8.0 | (A) 43.6 mm² (TH.EF) 61% | 37.6 mm² (TH.EF) 62% | 33.2 mm² (TH.EF) 62% |

CRM: No. of Crimps
H: Height of Ridge
TH.EF: Thermal Efficiency
W: Pitch Width
A: Area of Passage It can be summarized that the number of the crimps and the height of the crimp's ridge define the transverse area of each passage which affects the thermal efficiency. The transverse areas defined above were confirmed to be effective in practical use.

Figure 23:
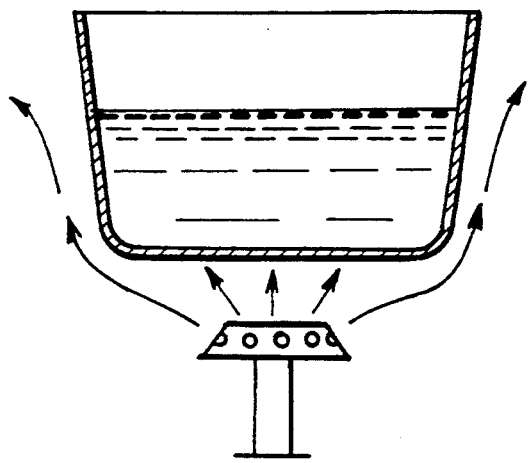
FIG. 23 is a diagrammatic representation of a conventional portable water heater.

Further the relationship between the thickness of the crimped plate and the length of the same was examined. The thermal efficiency of the water heater, shown in FIG. 20, was measured with variations of height and with variations of thickness as shown in FIG. 23.

Conditions of the experiments are fixed as follows;
Gas: isobutane
Flow rate: 250 cc/min, 0.56 g/min
Fluid Temp.: heated from 20 to 100 centigrade
Amount of Contents: 300 cc
Volume of Container: 350 cc
Pitch of Crimp: 9.4 mm
Height of Ridge: 7.0 mm
Area of Passage: 32.9 mm²

Figure 21:
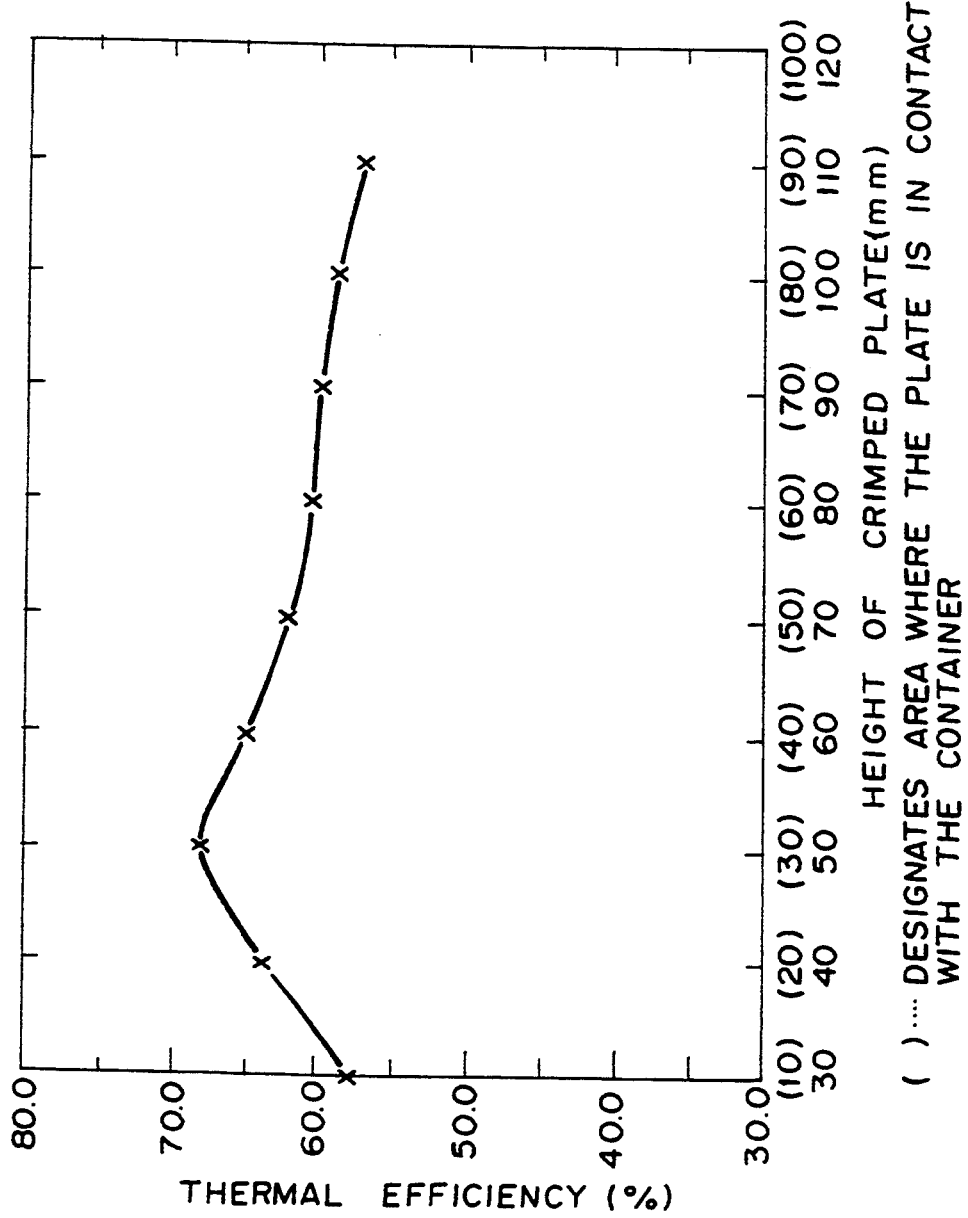
FIG. 21 shows a graph illustrating the relationship between the height of crimped plate and the thermal efficiency.
Figure 22:
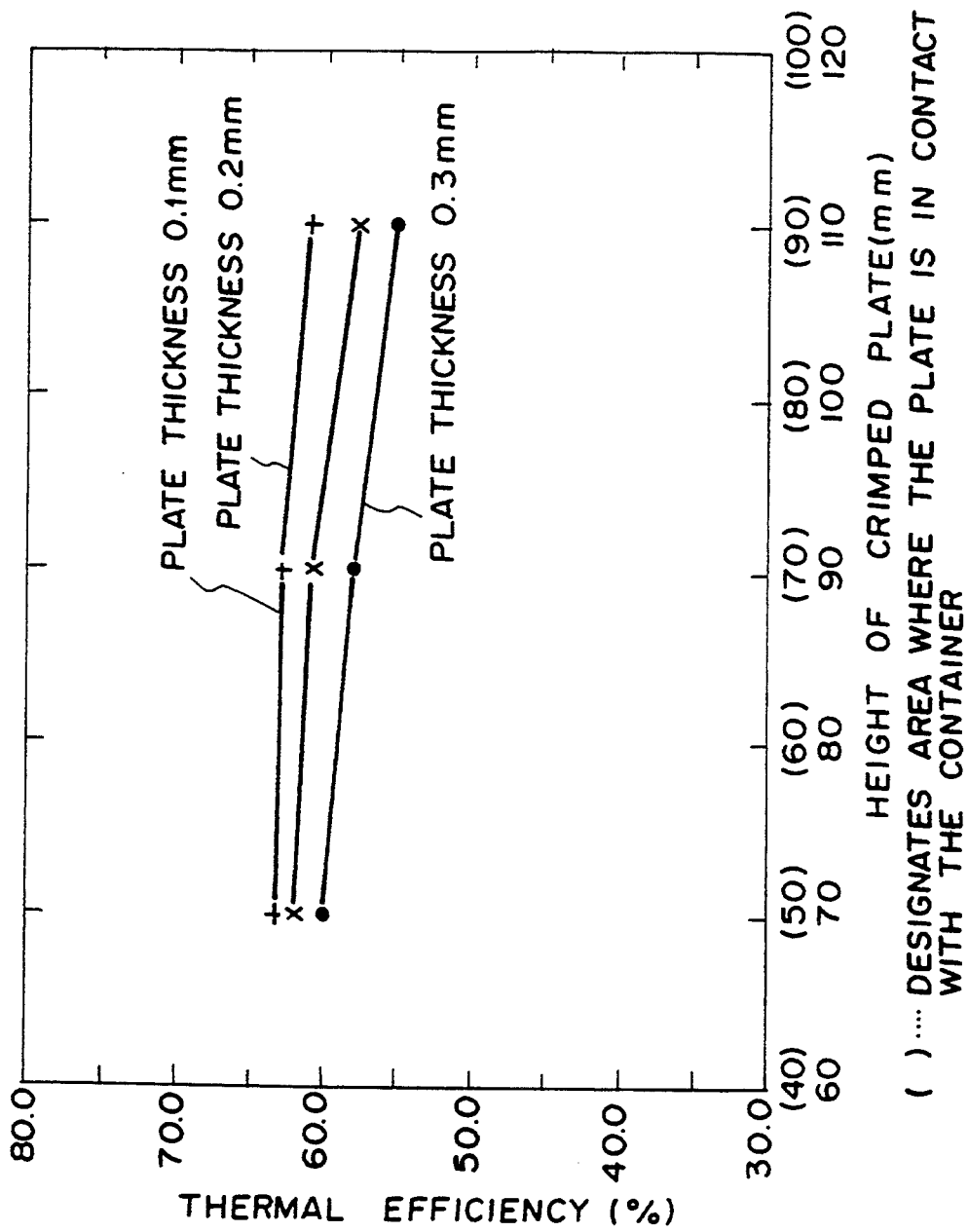
FIG. 22 shows a graph illustrating the relationship between the height of the crimped plate and the thermal efficiency with the plate thickness varied.

With the consideration of mechanical strength to support the container with dimensions as shown in FIG. 20, the thermal efficiency was measured using only the aluminum crimped plate with a thickness of 0.2 mm, with variations of the plate in height between 30 mm and 110 mm as shown in FIG. 21.

| Thermal Efficiency (Height of Plate) | | | | | |
|---|---|---|---|---|---|
| 30 mm | 40 mm | 50 mm | 60 mm | 80 mm | 100 mm |
| 58% | 63% | 69% | 65% | 61% | 59% |

As is evident from the above table, the thermal efficiency has its peak around the height of 50 mm and has declines as it approaches to the value obtained by the heater without the crimped plate.

In the meantime, the more the plate's height is increased, the less the thermal efficiency because of the increase in the area where heat is transferred outside the heater through the wall of the housing. In this experiment, the structure of the heater restricted the maximum height of the crimped plate to 110 mm.

Therefore, it can be said that the optimum thermal efficiency can be improved by approximately 70%, as shown in the above table, by selection of an optimum height of the crimped plate dependent on dimensions of the container.

Experiments were further performed with variations of thickness of the plate in the order of 0.1 mm, 0.2 mm and 0.3 mm. As can be seen from the following table, the more the thickness of the plate is increased, the more the heat capacity of the crimped plate which causes an increase in the heat loss, thereby causing the thermal efficiency to be dropped. From the view point of the heat capacity, the thickness of the crimped plate should preferably be reduced to such an extent that the mechanical strength of the heater is sufficiently assured.

| Thickness of Plate | Thermal Efficiency Height of Plate | | |
| --- | --- | --- | --- |
| | 70 mm | 90 mm | 110 mm |
| 0.1 mm | 62% | 62% | 61% |
| 0.2 mm | 62% | 60% | 57% |
| 0.3 mm | 62% | 58% | 56% |

As has previously been described herein, the triangular passages may alternately be formed in a sinusoidal shape. The triangular passage was found to be superior to the sinusoidal-shaped passage in thermal efficiency even when both have the same transversal area, because the latter passage occupies larger areas, where the passage is in contact with the housing wall, thereby increasing heat emission. More specifically, the thermal efficiency of the triangular passage is around 60%, whilst that of the sinusoidal-shaped passage is around 50%. However, it should be understood that the sinusoidal-shaped passage is still far superior, in thermal efficiency, to the conventional type heater without the insulation plate.

The triangular crimped plate is found to be preferable in supporting the container because a sharp ridge of the crimp securely holds the container.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent from persons skilled in the art.

What is claimed is:

1. A water heater comprising:
   a heated vessel with one end thereof open, and
   a housing integrally coupled with the heated vessel in such a manner as to surround the heated vessel with a given distance therebetween, wherein an upper end of the housing is coupled with an upper end of the heated vessel and a bottom open end of the same extends further downwards than the bottom of the vessel, the coupled area between the heated vessel and the housing is provided with at least one air outlet,
   a layer of crimped material disposed between the heated vessel and the housing and providing passages extending longitudinally between the upper end of the housing and the bottom of the vessel, the bottom end of the layer of crimped material extending below the bottom of the heated vessel, thereby forming a skirt, and
   a burner means disposed below the bottom of the vessel to produce a hot combustion gas, whereby the gas spreads over the bottom surface of the heated vessel, is collected by the skirt, and then flows upwardly through at least one passage in the crimped material between the heated vessel and the housing and escapes outside the heater from the air outlet after it provides heat to the heated vessel.

2. A water heater as defined in claim 1 wherein the layer of crimped material comprises a thermal insulating means, in a crimped shape, interposed between the heated vessel and the housing, whereby passages, formed between the heated vessel and the thermal insulating means, allow an upward flow of the hot combustion gas in contact with the side wall of the heated vessel and other passages act as an insulating means to prevent dissipation of the heat of the gas through the side wall of the housing.

3. A water heater as defined in claim 2, wherein the thermal insulating means is formed triangularly.

4. A water heater as defined in claim 2, wherein the thermal insulating means is formed sinusoidally.

5. A water heater as defined in claim 1, wherein the layer of crimped material comprises insulating means arranged in a crimped shape whereby the hot combustion gas flows upwardly through passages between the heated vessel and the housing in contact with the side wall of the heated vessel, heating the heated vessel.

6. A water heater comprising:
   a heated vessel with one end thereof open, and
   a housing integrally coupled with the heated vessel in such a manner as to surround the heated vessel with a given distance therebetween, wherein the housing comprises a thermal insulating means to be integrally interposed between the heated vessel and the housing, and the thermal insulating means being arranged in such a manner that passages, between the heated vessel and the insulating means, remain open whilst the other passages, between the insulating means and the housing, are evacuated inside and both ends thereof are hermetically sealed so that a plurality of separated evacuated compartments, which act as a thermal insulating layer, can be constituted in a juxtaposed manner with the hollow passages, and
   a burner means disposed below the bottom of the vessel to produce a hot combustion gas, whereby the gas spreads over the bottom surface of the heated vessel and then flows upwardly through a passage between the heated vessel and the housing and escapes outside the heater from the air outlet after it provides heat to the heated vessel.

7. A water heater as defined in claim 6, wherein the thermal insulating means are shaped triangularly.

8. A water heater as defined in claim 6, wherein the thermal insulating means are shaped sinusoidally.

9. A water heater comprising:
   a removable heated vessel with one end thereof open,
   a housing for receiving therein the heated vessel,
   a layer of crimped material disposed between the heated vessel and the housing and providing passages extending longitudinally between the upper end of the housing and the bottom of the vessel, the bottom end of the layer of crimped material extending below the bottom of the heated vessel, thereby forming a skirt, and
   a burner means disposed below the bottom of the heated vessel,
   wherein the layer of crimped material comprises a thermal insulating means, in a crimped shape, attached to the inner wall of the housing, whereby a hot combustion gas produced by the burner means spreads over the bottom of the heated vessel, is collected by the skirt, and then flows upwardly through passages between the heated vessel and the thermal insulating means, and whereupon the heated vessel is heated.

10. A water heater as defined in claim 9, wherein the heated vessel is provided with a flange having curvature enough to pour a contained fluid to a cup, and a catch to grip.

11. A water heater as defined in claim 9, wherein the heated vessel is tapered downwardly.

12. A water heater as defined in claim 9 comprising a thermal insulating means interposed between the heated vessel and the housing, and the thermal insulating means being arranged in such a manner that passages, between the heated vessel and the insulating means, are remained open whilst the other passages, between the insulating means and the housing, are evacuated inside and both ends thereof are hermetically sealed so that a plurality of separated evacuated compartments can be constituted to act as a thermal insulator.

13. A water heater as defined in claim 12, wherein the thermal insulating means is formed in triangular.

14. A water heater as defined in claim 12, wherein the thermal insulating means is formed in a sinusoidal shape.

15. A water heater comprising:
a removable heated vessel with one end thereof open, the heated vessel being tapered to be narrower downwardly,
a housing for receiving the heated vessel therein,
a layer of crimped material disposed between the heated vessel and the housing and providing passages extending longitudinally between the upper end of the housing and the bottom of the vessel, the bottom end of the layer of crimped material extending below the bottom of the heated vessel, thereby forming a skirt, and
a burner means disposed below the bottom of the heated vessel,
wherein the layer of crimped material comprises a thermal insulating means, in a crimped shape, attached to the inner wall of the housing and tapered so as to be engaged with the tapered surface of the heated vessel, whereby a hot combustion gas produced by the burner means spreads over the bottom of the heated vessel, is collected by the skirt, and then rises through passages between the heated vessel and the thermal insulating means, and whereupon the heated vessel is heated.

16. A water heater as defined in claim 15, wherein the thermal insulating means is formed triangularly.

17. A water heater as defined in claim 15, wherein the thermal insulating means is formed sinusoidally.

18. A water heater as defined in any one of claims 1, 9 and 15, wherein the layer of crimped material has a thickness of 0.1 mm.

19. A water heater as defined in any one of claims 1, 9 and 15, wherein the layer of crimped material has a thickness of 0.2 mm.

20. A water heater as defined in any one of claims 1, 9 and 15, wherein the layer of crimped material has a thickness of 0.3 mm.

21. A water heater comprising:
a heated container for containing fluids therein,
a housing for receiving the container, wherein the housing is provided with a pair of grooves, each being formed at a distance from each end of the housing, and wherein the housing is provided with an air inlet formed near the bottom thereof,
a burner means disposed below the bottom of the heated container,
a thermal insulating means, in a crimped shape, being fixedly situated on the inner wall of the housing in a manner so as to be sandwiched between the grooves and having an inwardly folded portion at the bottom end thereof to support the heated container in an abutted fashion, whereby a hot combustion gas produced by the burner means spreads over the bottom of the container and then rises through the passages between the heated container and the housing, and
an air outlet means being disposed on the top end of the heater and being provided with a plurality of vent holes for adjusting dissipation into the atmosphere of the combustion gas, that has reached the top of the heater, wherein an outer flange thereof is coupled with the top edge of the housing and an inner flange thereof is coupled with a top flange of the heated container.

22. A water heater as defined in claim 21, wherein the thermal insulating means is formed triangularly.

23. A water heater as defined in claim 22, wherein the heated container is a hermetically sealed metal bottle with a ring pull and is provided with a circular support protruding adjacently around the edge, whereby the hot combustion gas, once spread over the bottom surface of the bottle, is forcibly introduced into the passages formed between the heated container and the thermal insulating means.

24. A water heater as defined in claim 22, wherein the thermal insulating means is formed triangularly.

25. A water heater as defined in claim 22, wherein the thermal insulating means is formed sinusoidally.

26. A water heater as defined in claim 21, wherein the thermal insulating means is formed sinusoidally.

27. A water heater as defined in claim 21, wherein the air outlet means is a ring-shaped plate with a hollow at the center thereof to secure the top flange of the heated container so that the container can be supported at the center of the heater.

* * * * *